Patented Apr. 9, 1940

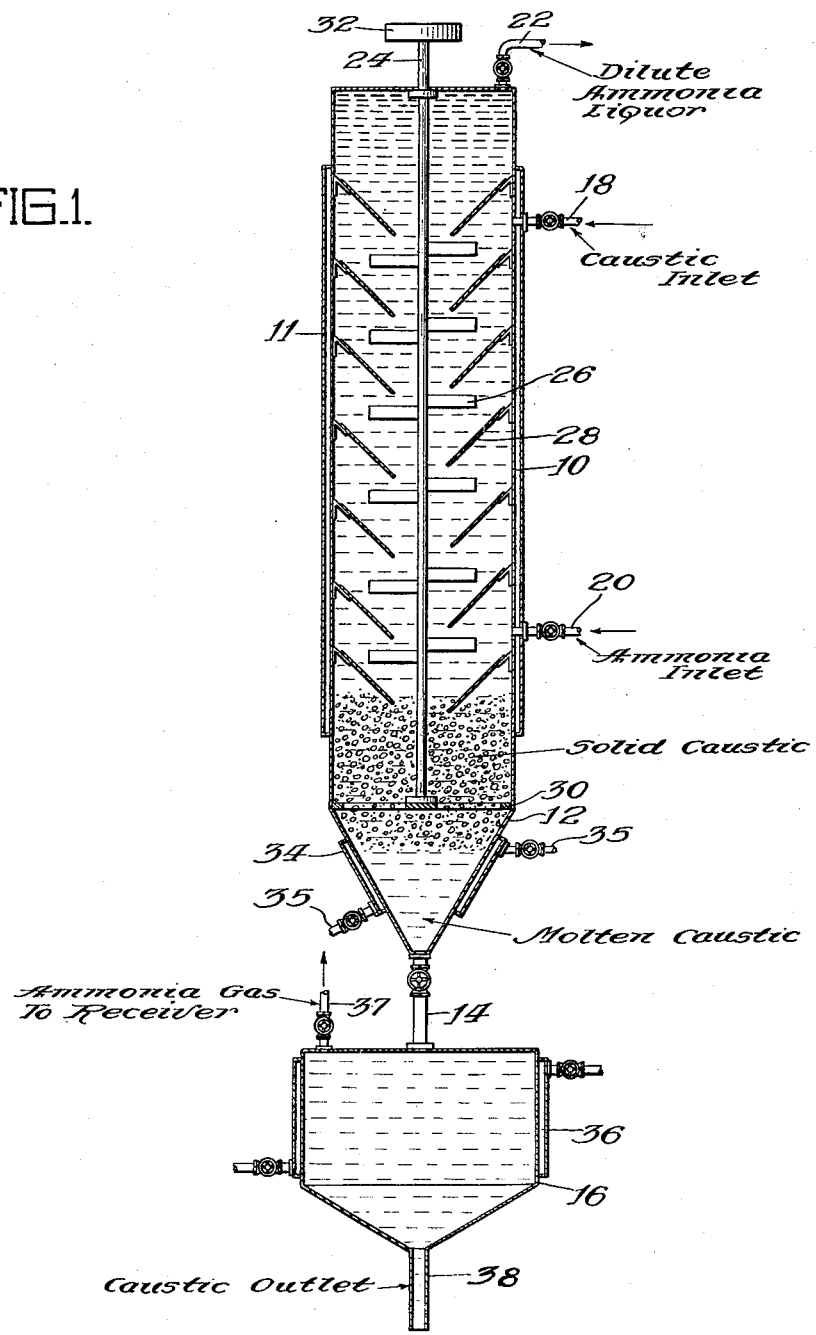

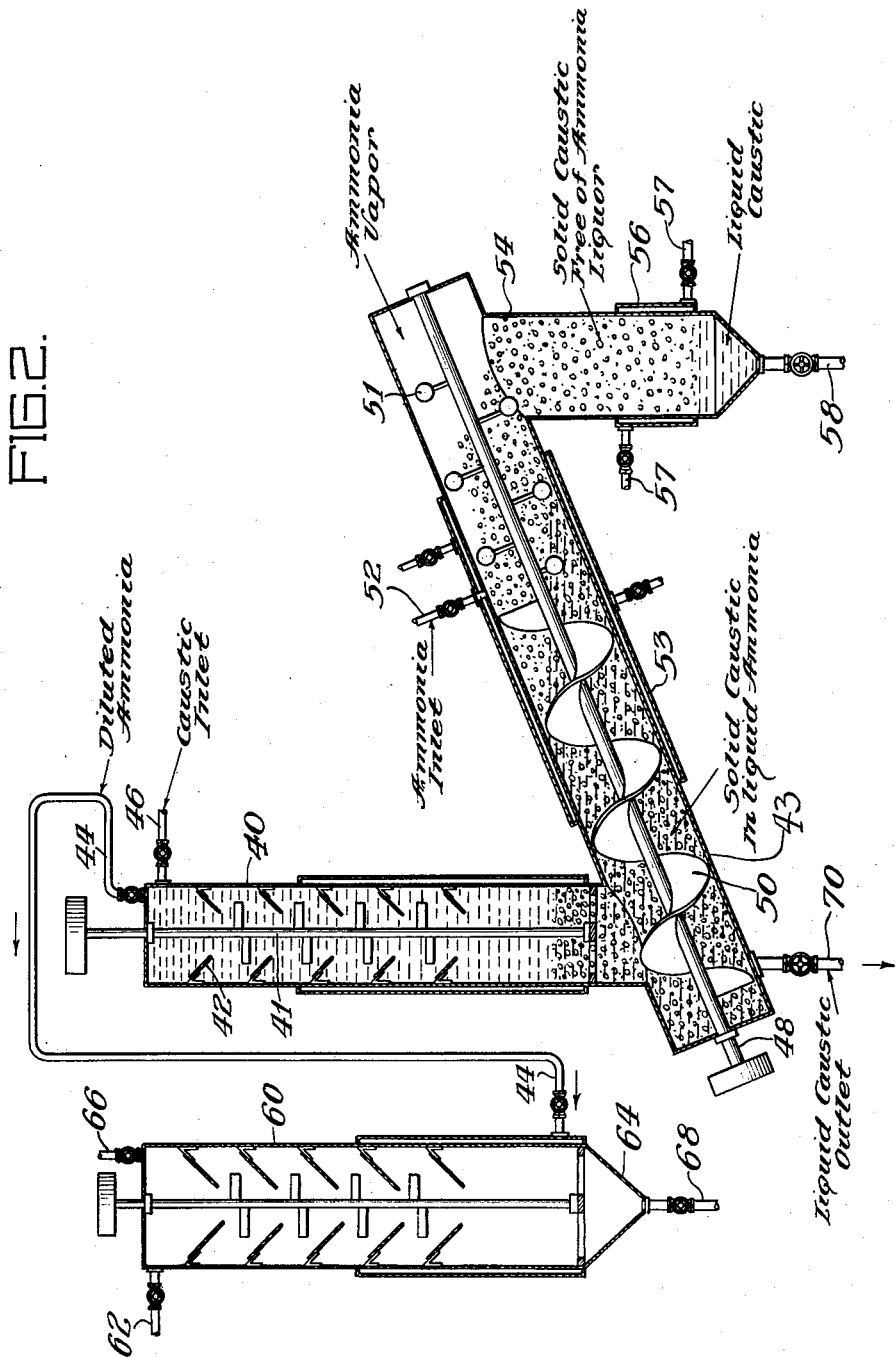

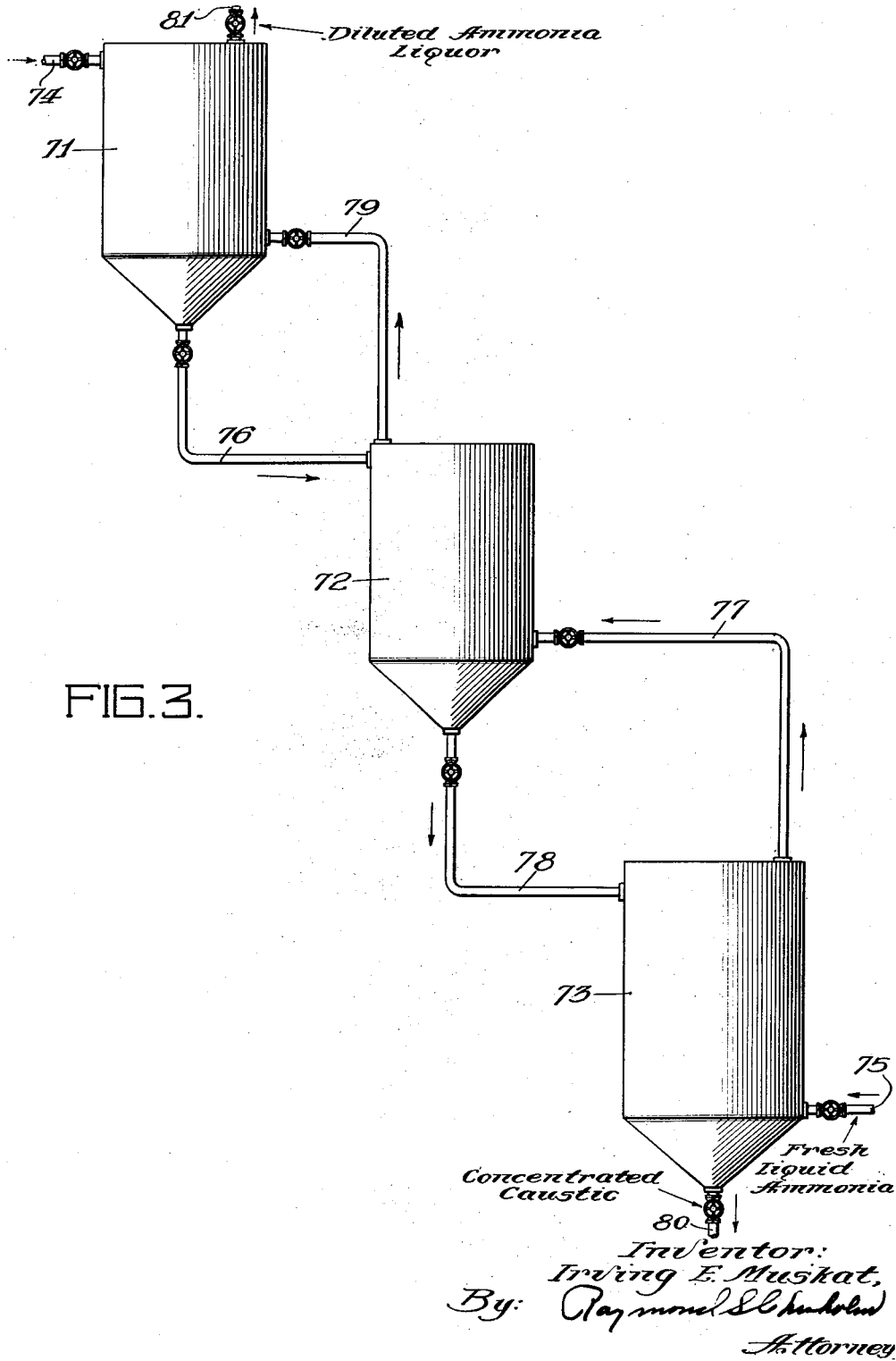

2,196,594

UNITED STATES PATENT OFFICE 2,196,594

CONCENTRATION OF CAUSTIC

Irving E. Muskat, Akron, Ohio, assignor to Pittsburgh Plate Glass Company, Allegheny County, Pa., a corporation of Pennsylvania Application December 11, 1937, Serial No. 179,334

24 Claims. (Cl. 23—184)

This invention relates to the concentration, purification and crystallization of certain solutions of alkali metal hydroxides and more particularly to the dehydration, crystallization, and purification, (partial or complete), of aqueous solutions of sodium hydroxide of at least 50 percent concentration.

This application is a continuation-in-part of my copending application 93,022, filed July 28, 1936.

Caustic soda solutions, as initially produced in commercial processes, are relatively dilute solutions, the concentrations of which are in general from 8 to 12 percent by weight. These solutions are contaminated with a large number of impurities, such as sodium sulphate, sodium chloride, chlorates, iron, etc., which must be removed in order to produce a commercially satisfactory product.

In the neighborhood of about a 50 percent concentration of caustic soda, many of these impurities have a minimum solubility in caustic solutions, and since the production of a concentrated caustic from these relatively dilute solutions is necessary, the usual practice is to concentrate the impure caustic to this concentration by simple vaporization and to remove these impurities by settling or filtering. If greater purity is desired, crystallization of sodium hydroxide as a hydrate may be resorted to. For example, according to Patent No. 1,733,897 to Hooker and Marsh, the 50 percent filtered caustic liquor is diluted to approximately 39 percent, at which concentration the 3½ hydrate is caused to crystallize at a reduced temperature of 10° C. Approximately 50 percent of the caustic is crystallized. The mother liquor which contains the impurities cannot be satisfactorily purified and is sold as an impure product. The 3½ hydrate crystals are then melted and reconcentrated to 50 percent.

These various manipulations entail such a large expenditure of time, labor, and money that electrolytic caustic, which must be purified by such a process, has been at a decided disadvantage in competing with caustic made by the ammonia-soda process. Even after purifying electrolytic caustic by means of these expensive crystallization processes, the final purified product is more corrosive than lime-soda caustic.

The preparation of a purified 50 percent caustic, however, is not the only difficulty. It is commonly recognized that caustic soda in higher concentrations is corrosive, and is readily contaminated. Hence, every manipulation through which the caustic is put, after it has been purified, results in contamination by reason of the fact that the caustic attacks the apparatus in which it is treated. Often it has been considered desirable to dehydrate the 50 percent caustic to produce 70 to 75 percent, or even anhydrous, caustic. The production of 70 percent caustic is usually carried out by vaporization at reduced pressures. Even with the best of equipment, the heated product corrodes the apparatus and becomes contaminated and thus the production of a 70 percent caustic, having a purity equal to that of the initial 50 percent caustic from which it was produced, has not been satisfactorily accomplished by any commercial process of which I am aware.

The purity of the product is even further reduced when concentration from 70 percent to the anhydrous state is attempted. Since evaporation, as carried out with dilute caustic liquors, is no longer possible, the caustic is placed in cast iron pots and vigorously heated in an open flame. In order to drive off the last traces of water, temperatures as high as 1100° F. must be resorted to. Again the corrosive nature of the caustic at these high temperatures is so great that it attacks the pot extensively and further contamination of the caustic takes place.

Sulfur is added to precipitate the iron and even after complete dehydration, the caustic must be kept molten for many hours to allow the precipitate to settle out. Even with these operations, commercial preparation of pure anhydrous caustic has been well nigh impossible. So far as I am aware, there is no known process of commercially producing anhydrous caustic of a purity which even approximates that of a 50 percent solution.

Numerous other methods of concentration have been proposed, but none have been accepted commercially. Among these is a method described in U. S. Patent 1,961,590, granted to R. B. MacMullin, wherein it is proposed to dehydrate aqueous caustic solutions of 20 to 30 percent concentration, by addition of 125-200 parts of liquid ammonia to 100 parts of such caustic solutions, the result being the formation of two liquid layers. Upon separation of the lower layer and elimination of ammonia by evaporation, a more concentrated caustic solution is produced; however, if it is attempted to produce a substantially greater concentration, the yields are relatively low since a very substantial proportion of the initial caustic (in general, upwards of 35-40%) migrates into the upper ammonia layer. This results in the production of such a large quantity of a caustic solution which is more dilute than the initial solution being treated that the process described by this patent can not be used as a commercial concentration process. Hence, further concentration in excess of this value is not secured by this process, and if more concentrated caustic is desired, conventional methods of concentration by evaporation are resorted to.

Increasing the quantities of ammonia in relation to the amount of 20 to 30 percent caustic solution does not result in a substantially more concentrated solution, nor are the yields increased; and in some cases no separation or concentration takes place. For example, when 8, 10 and 20 parts of ammonia, respectively, are added to 1 part of 20 to 30 percent caustic soda solution, no separation into different liquid layers is obtained and a quantity of solid material precipitates out of solution; while when 400 parts of liquid ammonia are added to 100 parts of such caustic solution, two layers are formed, but only about 25 percent of the caustic is separated as a solution of substantially 50 percent concentration. This yield is too low to be commercially significant. Further reduction of the ratio of ammonia increases the yield but decreases the concentration of the caustic.

In addition, the process as described by this patent is not directed to, nor adapted for the removal of impurities and avoidance of contamination since, at the low concentrations of caustic soda dealt with herein, satisfactory removal of such impurities as sodium chloride can not be obtained by liquid ammonia treatment. The removal of this or other impurities may be essential for many purposes, and obviously it would be highly advantageous from an economical standpoint if they could be removed as a consequence of a concentration process.

By operating in accordance with my invention, it is found that when a caustic soda concentrate, containing 50 percent or more of sodium hydroxide, is isolated and treated with liquid ammonia, I am able to secure substantially increased concentrations of the sodium hydroxide in the order of about 60 percent or higher; or if required, above 69 percent concentration, or even an anhydrous product. At the same time, I am able to obtain a further purification of the caustic soda liquor by removal of various salts, in particular, sodium chloride and sodium chlorate, notwithstanding the presence of more or less water in the ammonia.

The term "liquid ammonia" in this application is intended to include anhydrous liquid ammonia and mixtures of ammonia and water which contain at least enough ammonia (in general above 65 percent $NH_3$ concentration) so as to insure the separation of a liquid phase consisting preponderantly of sodium hydroxide or sodium hydroxide and water, when the ammonia and caustic are brought together. The mixture of ammonia and water described above is often designated in this specification as "partially hydrated liquid ammonia."

There is found to be a marked difference in the phase relationships which are established when high concentrations of caustic soda, for example, 50 percent or above, are treated with liquid ammonia, and those which arise when more dilute solutions, such as 20 to 30 percent solutions of caustic soda, are so treated. In the treatment of about 50 percent and higher concentrations, caustic containing substantially more than 50 percent sodium hydroxide may be produced and it is possible thereby to obtain any desired concentration from 50 percent to the anhydrous state.

In the separation of phases that takes place when such solutions are treated, a solid phase may also be separated in greater or less proportion in the presence of a concentrated caustic liquid phase and an ammonia phase. This solid differs in caustic concentration from the caustic liquor and is in general, of greater caustic content. Hence, by regulating the quantity of solid withdrawn with the concentrated caustic liquor, very high concentration of caustic may be obtained and the concentration of caustic may be easily controlled. This regulation is not feasible in treatment of 20–30 percent solutions since upon addition of the enormous quantities of ammonia required to cause precipitation of substantial quantities of solid from such solutions, no appreciable separation of a concentrated caustic liquor from an ammonia liquor can be detected. In addition, the yields obtained by the treatment of 50 percent solution and above are extremely high and only very small quantities of the initial NaOH (usually not more than 4 or 5 percent) moves into the upper layer. These yields markedly distinguish from the 25 to 50 percent yields obtainable in the treatment of 20 to 30 percent solutions heretofore described. Furthermore, the addition of 8 to 20 parts of anhydrous liquid ammonia to one part by weight of 50 percent caustic results in a separation of liquid phases, whereas no such separation is obtainable when such proportions of liquid ammonia to caustic are added to 20 to 30 percent solutions as heretofore set forth. Additionally, the treatment of caustic soda of 50 percent concentration, or above, with liquid ammonia results in a removal of certain impurities, particularly, sodium chloride, to a degree which is wholly unattainable when 20 to 30 percent solutions are so treated.

I have found that 50 percent caustic can be concentrated to any desired extent up to the anhydrous state by subjecting the caustic to progressive treatment by repeated washing or extraction with liquid ammonia. These extractions may be effected by repeatedly washing the caustic with anhydrous liquid ammonia, or partially hydrated liquid ammonia, as for example, by treating the caustic with progressively increasing concentrations of liquid ammonia. In each case, each washing is followed by a removal of part or all of the ammonia liquor before the next washing is effected. One excellent and especially effective means of carrying out this process is to treat the 50 percent caustic countercurrently with ammonia.

I have also discovered that the liquid ammonia not only effects concentration of the caustic, but further purifies it as well. Thus, when liquid ammonia is added to caustic solutions, certain impurities in the caustic solution, such as sodium chloride, chlorates, and others, are dissolved by the ammonia phase and are removed to a large extent. In this way, my process both avoids the contamination during concentration which has been the objectionable feature of prior art processes, and in fact also effects a further purification. Hence, by my process I am able to secure highly concentrated caustic which is just as pure or even purer than 50 percent solutions, as above referred to; and by combining my process with a caustic purification process, I am able to obtain results commercially which hitherto were regarded as impossible.

A method of treatment in accordance with my invention which I have found to be highly efficient, comprises concentrating and purifying the hydroxide solution by permitting it to settle or otherwise pass through a body or plurality of bodies of liquid ammonia. I may conduct such a process, for example, by introducing the solution to be concentrated in the upper portion of a column and allowing it to settle thru a rising body of liquid amonia which is introduced into a lower portion of the column. The concentrated caustic is withdrawn from the lower part of the column, while the ammonia, together with the absorbed water, is withdrawn from the upper portion thereof.

The invention will be fully understood by reference to the following description illustrated by the accompanying drawings in which—

Fig. 1 is a diagrammatic sectional view of apparatus suitable for carrying out the method embodying my invention.

Fig. 2 is a diagrammatic sectional view illustrating a modification of Fig. 1.

Fig. 3 is a flow sheet diagrammatically illustrating another suitable method for carrying out the process.

The equipment used in carrying out the present invention is of sufficiently sturdy construction to withstand the pressures necessary to carry out the process. The apparatus may be of steel, or any other suitable material. In the specific form illustrated in Fig. 1, hereinafter described, I may use a jacketed cylinder 10, having a bottom 12, preferably conical, connected to a conduit 14 which discharges into a receiving receptacle 16. The temperature in the cylinder 10 can be controlled either by means of the steam jacket 11, or by means of coils, electrical heating elements, or any other suitable means. Caustic soda solution to be concentrated is admitted to the cylinder 10 somewhat below the top thereof, through a conduit 18, and liquid ammonia is admitted at a point above the bottom of the cylinder through a conduit 20. The ammonia liquor, after it has become admixed with water and impurities carried by the caustic, finds exit through a discharge conduit 22 at the top of the cylinder, and may pass directly to an ammonia still (not shown), for reconcentration to be subsequently reused, or may be employed for purification as hereinafter described.

The cylinder 10 may be provided with an agitator, which suitably comprises a suitably journaled shaft 24 extending coaxially of the cylinder and supported at one end by a bearing secured in spider 30. The other end of the shaft extends outwardly through a gland (not shown) in the top of the cylinder where it is provided with suitable driving means, such as a pulley 32. The shaft carries suitable transversely extending mixing or agitating blades 26 which terminate at a substantial distance above the bottom of the shell 10, thereby providing a zone of relative quiescence in the lower portion of the cylinder in which, if desired, concentrated or solid caustic admixed with liquid ammonia may collect. The lower portion of this zone may be heated by any convenient device, for example, by steam jacket 34 connected to steam lines, 35, or by steam coils, electrical heating elements, etc. Similarly, the receiver 16 may be equipped with a suitable heating jacket 36, electrical heating element, or other device for purposes of maintaining an elevated temperature of the contents. Receiver 16 is also provided at its top with a vent 37 for any ammonia vapors which may be entrained in the caustic and at its bottom with a conduit 38 for the discharge of the liquid caustic.

In a specific example of the operation of the apparatus described, the cylinder 10 is charged with liquid ammonia through the conduit 20 and caustic soda of a concentration of approximately 50 percent or upward is supplied through the conduit 18. The ammonia gradually passes upwardly, taking up water and impurities from the caustic with which it contacts.

Baffle plates 28, preferably inclined downwardly from the walls of the cylinder and slightly spaced therefrom, are provided within the cylinder 10 and serve to divide the solution into a multiplicity of superposed relatively quiescent zones of treatment which are partially segregated from each other. These baffles are large enough to prevent rapid intermixing of the liquor in one zone with the liquor in another. As a result of the downward flow of the caustic and the upward flow of the liquid ammonia, it is readily seen that the composition of the liquor in each zone will be different from that in any other zone since the ammonia will be highly concentrated in the lower zones, and progressively more dilute in the upper zones. In effect, then, the incoming caustic will be treated by a series of separate ammonia liquors containing progressively increasing concentrations of liquid ammonia, and the more concentrated caustic settling to the lower zones will be intimately contacted with the more concentrated ammonia liquors. While baffles afford a convenient means for establishing this multiplicity of superposed zones it will be apparent that other means may be resorted to in order to obtain the same effect.

Eventually, the diluted ammonia is drawn off at the top as a partially hydrated liquor and may be concentrated by distillation for reuse, or it may be employed to partially purify 50 percent or more concentrated caustic liquor by removal of NaCl, NaClO₃ and the like as will be hereinafter discussed.

The treated caustic collects in the cylinder below the ammonia inlet. If the temperature is kept above the melting point or the softening point of the caustic, and the ammonia-caustic ratio is properly maintained, a melted concentrate will be produced. Thus other conditions being maintained the same, with increasing temperature the tendency will be to form a molten concentrate, and with lower temperatures, to form a solid concentrate. With constant temperature, with an increasing ratio of ammonia to caustic under treatment, the tendency will be in the direction of a greater degree of dehydration and with it, to form a solid concentrate, and conversely. If desired, the caustic may be caused to solidify during settling in the lower portion of the cylinder as illustrated. The solidified caustic phase may then be liquefied in the conical bottom of the cylinder by the application of heat from steam jacket 34. The pressure in the system may be used to force the liquid caustic downwardly through the conduit 14 into the receiver 16. The receiver is usually maintained at a lower internal pressure than the cylinder 10, and upon admission to it of the molten caustic, most of the residual ammonia carried by it flashes into vapor, passes off through vent 37 and is conveyed to a receiver (not shown). Traces of ammonia remaining in the caustic may be removed by suitable methods as, for example, by blowing gas through the concentrate or by subjecting it to vacuum treatment. Fluidity of the caustic in the receiver is maintained by means of the heating element and from time to time, or continuously, the liquid is drawn off to storage or to apparatus for further treatment.

The form of apparatus shown in Figure 2 may be employed when it is desired to produce highly concentrated caustic. It consists of an upright shell or cylinder 40 of relatively strong construction to withstand the pressure of liquid ammonia. Within the cylinder there is an agitator 41 and baffles 42. A conduit 46 disposed below the upper end of cylinder 40 is provided for admission of the caustic liquor to be treated. The cylinder 40 discharges at its lower end into an upwardly inclined cylinder or leg 43, and is also provided with a conduit 44 at its upper end for the discharge of spent ammonia liquor.

In the inclined leg or cylinder 43, there is an axially disposed shaft 48 which at its lower end carries a screw conveyor 50, designed to move the solids axially up the cylinder and thus to separate them from the ammonia and caustic liquor. At the upper end of cylinder 43 a series of spirally arranged scoops or paddles 51, carried by shaft 48, are provided to agitate the solid sodium hydroxide moving up through cylinder 43 to prevent the particles from agglomerating and to secure a more adequate washing of the solids. Concentrated liquid ammonia is admitted to the inclined cylinder 43 at a point intermediate the length thereof through a suitable conduit 52. A suitable steam jacket 53 or other heating element may be provided about the cylinder 43, for purposes of assisting in vaporizing ammonia in the upper portion thereof.

The upper extremity of the inclined cylinder 43 discharges into a suitable receiver 54 which preferably is provided with a heating device, for example, a steam jacket 56 connected to steam lines 57. The receiver is also provided at its lower extremity with a discharge conduit 58 through which liquid caustic may be permitted to flow to a suitable receiver.

In the operation of this embodiment of the invention, caustic soda solution is admitted through the conduit 46 to cylinder 40, and ammonia in the liquid state, preferably substantially anhydrous, is admitted through conduit 52, passing through cylinder 43 to enter the lower end of cylinder 40. As the two liquids pass counter-currently through the cylinder 40, concentration of the caustic phase to 60, 65, 70, or higher percent may result.

The concentrated product settles from cylinder 40 into the lower end of cylinder 43 and may be maintained at a temperature sufficiently high to prevent the precipitation of the monohydrate. A temperature of about 70° C. will be satisfactory for this purpose. Anhydrous sodium hydroxide is caused to precipitate from the heated solution by the introduction of the substantially anhydrous liquid ammonia at 52 and the precipitated caustic is carried upwardly through the cylinder by the screw 50 and is discharged into the receiver 54. A temperature sufficiently high to vaporize the ammonia may be maintained in the upper portion of leg 43 whereby a vapor zone is created. As the solid anhydrous caustic is removed, a quantity of caustic liquor will be occluded, absorbed or otherwise carried along by it and the concentration of the final product will depend upon how much of this liquor is carried over. If the conveyor is operated rapidly, or if the cylinder 43 is only slightly inclined, it will be found that the product drawn off at 58 will be of a concentration somewhat in excess of 70 percent, but will not be anhydrous. On the other hand, if the conveyor operates more slowly, or if the cylinder 43 is more steeply inclined, a more nearly anhydrous or a substantially anhydrous product can be secured since the solid caustic will drain and will be more thoroughly washed by the ammonia. Regulation of the rate of operation of the conveyor, the inclination of the cylinder 43, and control of the proportion of liquid ammonia used affords an easy method of regulating the concentration of caustic to be produced.

By this process, I obtain a very advantageous washing of the anhydrous caustic since it is removed in a direction counter-currently to the incoming liquid ammonia which bathes the outgoing anhydrous caustic and removes impurities or absorbed caustic liquor therefrom, or it may also dehydrate the absorbed caustic liquor. While I have described this modification of my invention in connection with the production of anhydrous caustic, it should be noted that it is equally valuable when any solidified product, such as hydrates or ammoniates of caustic, or caustic soda of any other concentration is being formed under similar circumstances.

The ammonia passing off from column 40 may be passed directly to a suitable ammonia still (not shown) for reconcentration, or it may be passed to a second column 60 for a purpose and in a manner to be hereinafter described.

The caustic deposited in receiver 54 may be melted and withdrawn at 58, or may be removed as a solid. A liquid concentrate in the neighborhood or about 70 percent may be withdrawn from the lower end of cylinder 43 as at 70. In each case it is found that the resultant concentrate will be of high purity and substantially uncontaminated. It appears that the ammonia containing more or less water withdrawn from the caustic exercises a preferential solvent effect for impurities such as sodium chloride, sodium chlorate, and others. No substantial contamination occurs during dehydration, and I am able to produce anhydrous, or other concentrations of caustic, which are just as pure, or in some cases even purer than the 50 percent concentrate from which it is derived. This process is especially adapted for the treatment of electrolytic caustic, since by operating in accordance with this process I am able to produce electrolytic caustic of even higher purity than that produced by the ammonia-soda process. While I have described this process in relation to the production of caustic in concentrations in excess of 70 percent, it is evident that it may be used to produce caustic in any concentrations above 50 percent and up to about 100 per cent. For example, the dihydrate might be held in solution to permit the monohydrate to precipitate and the concentration of the product produced can then be regulated by regulating the amount of solution drawn off with the precipitated monohydrate.

Various modifications of the above processes are permissible as either solid or liquid aqueous caustic may be concentrated to produce a solid or liquid product. Thus, I may introduce solid or liquid caustic at the top of cylinders 10 and 40, respectively, and maintain the caustic during the course of treatment either in the solid or liquid state; or, I may permit the caustic to precipitate or solidify during the treatment. The caustic, after treatment, may be withdrawn as a liquid or a solid. Usually, I find it preferable to introduce the caustic in the liquid state and maintain it as a liquid during the course of the treatment and remove it as a liquid from the reactor; or, I may permit the treated liquid caustic to solidify or crystallize near the bottom of the reactor and remove it as a crystallized product or remelt the crystals or solid and remove the caustic in the liquid state. The above variations may be controlled by the operating conditions such as temperature, pressure, agitation, contact time, etc., and by control of the concentration of the caustic and ammonia, as will be more fully described subsequently.

The temperature maintained during treatment is capable of wide variation, so long as it is below the critical temperature of ammonia, being largely dependent upon whether solid or liquid concentrates are to be produced. It is not necessary that a uniform temperature be maintained throughout the apparatus, and very often it is desirable that the temperature should not be uniform. Thus, in the columns 10 and 40, respectively, the temperature may vary from top to bottom so that entering caustic is subjected to a gradually increasing or decreasing temperature. Again, in some cases, it may be desirable to subject the caustic to repeated solidification and melting treatments as it passes downwardly through the cylinder, thereby securing an additional purification by the crystallization of a purer caustic out of an impure mother liquor. Under such conditions, the caustic moving downwardly would be passed through alternate zones of higher and lower temperatures.

The pressures must, of course, be sufficient to maintain the ammonia in the zone of dehydration in the liquid state. In general, the pressure may be maintained at some value upwards of 100 pounds per square inch. The degree of agitation and time of contact should be such that the liquid ammonia and the caustic being treated are intimately commingled and will depend largely upon the degree of concentration desired and whether it is desired to secure a liquid or solid product.

Care should be exercised in controlling the amount of water present in the ammonia liquor as it is removed from the upper portion of the column since if too much water is present therein, the two liquid phases may tend to merge and finally disappear. In general, the process is controlled in such a manner as to enable the withdrawal of an ammonia liquor containing upwards of 65 percent $NH_3$. The tendency of the phases to disappear is especially noticeable when solutions of low concentration (20–30 percent) are introduced in the upper portion of the column. In treating solutions of high concentration, for example, about 50 percent or above no great difficulty is encountered in the ensuing separation of two liquid phases.

When the treatment is conducted countercurrently with vigorous agitation in a column at a temperature of about 70° C. or thereabout, a ratio of about one to two parts of anhydrous liquid ammonia to one part of 50 percent caustic liquor is usually sufficient, but this ratio may likewise be widely varied.

Suitable illustrations of the process as carried out in the apparatus of Figures 1 and 2 are given as follows:

In one electrolytic caustic liquor having the following analysis—

|   | Per cent |
|---|---|
| NaOH (approx.) | 50 |
| NaCl | 1.05 |
| $NaClO_3$ | 0.46 | was continuously introduced at inlet 18 in the apparatus of Fig. 1, and substantially anhydrous liquid ammonia continuously introduced at inlet 20 in proportion of one and one-half parts by weight to one part of the caustic liquor. A temperature of 70° C. and pressure of 750 pounds per square inch was maintained within the apparatus, the concentrate being kept in the molten state. This molten caustic was continuously withdrawn at 14, diluted ammonia liquor removed at 22, and a caustic concentrate of the following analysis was produced:

|   | Per cent |
|---|---|
| NaOH (approx.) | 70 |
| NaCl | 0.06 |
| $NaClO_3$ | 0.00 |

In a similar manner, one part of 50 percent, (approx.), caustic of the character above described was continuously treated with five parts of liquid ammonia at a temperature of 70° C. and a pressure of 750 pounds per square inch, using the device shown in Fig. 2. In this case, precipitated caustic was withdrawn from the base of the column 40, further treated in column 43, and deposited in receiver 54, melted at a temperature of 317° C. and withdrawn. The concentration of caustic was approximately 98 percent, and the percentage of impurities was markedly reduced, as in the previous example.

The flow sheet, shown in Fig. 3, illustrates another modification of my invention. It is to be understood that this flow sheet is merely a diagrammatic illustration and that many other modifications are possible. A three-stage process of dehydrating caustic is herein illustrated wherein water is progressively removed in each of the three treaters, 71, 72, and 73. These treaters may be of any suitable construction, as for example, those described in Figs. 1 and 2. This is in no way essential, however, and it is to be understood that any convenient apparatus or type of settling tank may be used in which separation into a caustic phase and a liquid ammonia phase is secured.

In the specific embodiment shown, a 50 percent caustic solution is introduced into treater 71 at 74, and fresh liquid ammonia is introduced into treater 73 at inlet 75. The caustic in treater 71 is subjected to water absorption by contact with somewhat diluted liquid ammonia derived from treater 72 through conduit 79. This treatment concentrates the caustic solution and the separated concentrated caustic phase is drawn off at 76. The further diluted ammonia liquor is removed at 81 and may be reconcentrated and recycled or it may be used to treat other caustic liquors for dehydration and/or purification.

This process is repeated in treater 72 wherein the caustic entering through conduit 76 is treated with partially hydrated liquid ammonia entering through conduit 77, a still more concentrated caustic being withdrawn through conduit 78 and given a final concentration by the fresh liquid ammonia entering through conduit 75 in treater 73.

Concentration in each stage may be countercurrent, as in Figs. 1 and 2, or I may concentrate in each stage by one or a multiplicity of batch treatments or in any other desired manner. The 50 percent caustic to be treated by the process of the present invention may be produced by any of the processes which have been accepted commercially, as previously discussed, for this purpose.

If desired, the process may be made continuous so that caustic is continuously introduced at 74 and continuously withdrawn at 80. This is not essential, however, and the process may readily be carried out intermittently. Liquid or solid concentrates of any desired concentration may be produced in any or all stages of the process at will, as for example, by regulating the temperature in accordance with the melting or softening point of the concentration produced.

Either anhydrous liquid ammonia or a partially hydrated ammonia liquor may be introduced into the last stage. The following is an example of the process:

50 percent caustic was treated countercurrently in two stages, substantially anhydrous liquid ammonia being introduced in the final stage. In the first stage, the caustic was concentrated to 70 percent by treatment with the partially hydrated ammonia liquor from the second stage, removed and allowed to solidify. This product was removed to a second stage treatment, in which it was melted and treated with substantially anhydrous ammonia. A highly concentrated, fluffy, porous caustic was produced in good yield and with high purity. The ammonia liquor from the second stage treatment was used as the concentrating liquor in the first stage. The temperature of the first stage was 65° C., and in the second stage was 70° C. The concentrate produced was extremely pure and no contamination occurred during treatment.

In a second example, 59 percent caustic was treated countercurrently in 3 stages with liquid ammonia, which as introduced in the final stage, contained about 5 percent water. In the first stage, the caustic was concentrated to 65 percent by treatment with ammonia liquor from the second stage, removed in a melted state and introduced into the second stage. In the second stage, by treatment of the ammonia liquor from the final stage, the caustic was concentrated to 75 percent and was then sent to the third stage from which a caustic of about 83 percent concentration was withdrawn as a melted product, and allowed to solidify. A temperature of 75° C. was maintained in the three stages. The product was extremely pure and no contamination occurred during treatment.

In carrying out the invention, I may also treat a caustic liquor of any desired concentration, for example, 59 percent, with anhydrous liquid ammonia and use the resultant ammonia to treat more caustic of the same or different concentration, or to purify caustic without substantial concentration.

For example, in a final stage of treatment, as in treater 73 in the apparatus of Fig. 3, one part of 70 to 71 percent caustic was treated with five parts of anhydrous ammonia at a temperature of 70° C. A solid caustic produced was crystallized and withdrawn and two parts of the remaining ammonia liquor were used in treater 72 to treat one part of about 60 percent caustic derived from treater 71, at a temperature of 70° C. Partially dehydrated caustic of about 71 percent was withdrawn, passing into treater 73 and the ammonia liquor again used to partially dehydrate and purify a third portion of caustic of 51 percent concentration in treater 71.

While from a commercial standpoint, it may be desirable to make use of some process involving counter-current treatment, it may often be advisable to progessively remove water by successive washing with separate portions of liquid ammonia. The following examples illustrate this phase of my invention.

*Example 1.*—About 100 parts by weight of 50 percent NaOH at 100 degrees C. was treated in an autoclave successively with three portions of anhydrous liquid ammonia having a combined weight of 300 parts. After the last extraction, the residue consisted of approximately 50 parts of anhydrous, crystalline, free-flowing caustic soda. The total amount of ammonia employed may be varied over a relatively wide range depending upon the initial concentration of the caustic solution. As little as about two parts by weight per part of anhydrous caustic obtained may be sufficient. On the other hand, ten or more parts of ammonia per part of anhydrous caustic are also feasible.

*Example 2.*—About 180 parts by weight of 50 percent NaOH at 80° C. were treated successively with five portions of anhydrous ammonia having a combined weight equal to about eight times that of the anhydrous NaOH. The original solution contained 2.26% NaCl on solid basis (a typical electrolytic caustic liquor), while the residue after treatment was anhydrous, crsytalline caustic containing only .03% NaCl.

*Example 3.*—About 200 parts by weight of 72 percent NaOH were treated with successive portions of liquid ammonia at 50° C. amounting in all to 350 parts. The water was progressively absorbed from the caustic with eventual formation of crystals of anhydrous material. The resulting anhydrous caustic was an exceedingly light porous fluffy powder; that is to say, a powder, the individual particles of which contain fine pores or cells.

*Example 4.*—About two parts by weight of 50 percent electrolytic NaOH containing 0.43 percent chlorate and 1.02 percent sodium chloride, was treated at 70° C. in iron equipment, under a pressure of 700 pounds per square inch, with three parts by weight of anhydrous ammonia and the ammonia liquor removed. The resultant product was subjected to successive washings with liquid ammonia in the same manner until a residue of anhydrous crystalline caustic was produced. No chlorate was found in the product, and the sodium chloride content was found to be 0.04 percent.

The number of treatments required to remove the water from the concentrate will be governed in part by the concentration of the initial caustic, the concentration to be obtained in the final product, the concentration of liquid ammonia used, the degree of agitation, time of contact, and temperature.

Usually, I find it desirable to concentrate in the liquid state and when solidified caustic is to be treated, I usually operate at a temperature sufficiently high to melt it and maintain it in the molten state. If necessary, I may allow solidification or precipitation of concentrated caustic to occur in the later stages of the process, but I find that the major portions of the concentration is best effected while the caustic is kept molten. This tends to minimize any tendency of the device to plug and therefore become inoperative. However, if it is desired, I can concentrate caustic either in the solid or liquid state; and, by proper regulation of the temperature, pressure, agitation, contact and concentration of ammonia used, either solid anhydrous, or hydrated caustic may be precipitated.

In accordance with one phase of my invention, I may add sufficient ammonia to caustic liquor to cause separation of two liquid phases and a solid caustic phase. The solid precipitate may then be removed in a suitable manner, for example, by filtration. By one very effective method of filtration, the liquor may be filtered in such a manner that the lower phase is first withdrawn through the filter, the ammonia liquor phase passing through the filter thereafter. By such a process, I am able to secure a desirable washing of the solid hydroxide which collects upon the filter surface by the ammonia liquor thereby assuring the production of very pure hydrated caustic.

In some cases, concentration of solid hydrated caustic without any melting whatsoever may be desirable. For example, I have found that solid hydrated caustic will give up part or all of its water when extracted with an hydrous or partially hydrated liquid ammonia. This affords a very simple method for concentrating solidified concentrates which have been produced by any process, as it may be carried out by finely dividing the concentrate, intimately mixing the liquid ammonia, and removing the ammonia with its absorbed water.

I am not limited to treatment of caustic in any form, however, and the production of concentrates from either liquid or solid caustic is within the scope of my invention. Thus, I may produce both a liquid concentrate and a solid hydrate simultaneously, or I may find it desirable, in order to secure a particularly pure product, to convert the material to liquid, and then crystallize a solid and remelt, recrystallize, etc., until the desired purity and concentration is attained.

Attention is now directed to the modification of my process diagrammatically illustrated in Figure 2. I have discovered that in operating in accordance with my invention, if caustic liquor of an NaOH concentration of 50 percent or higher is treated with an ammonia liquor containing water in such proportions that, on admixture, two phases form in which the proportions of water are respectively the same as in the original liquors (the liquors being substantially in equilibrium as to their water content), the ammonia phase, being the lighter, will form the upper layer and the lower layer will be the caustic phase of about the same concentration, (on the ammonia free basis) as the original caustic liquor. When caustic liquor such as is derived from the electrolysis of sodium chloride, containing sodium chloride, chlorates, and other impurities evolved during caustic production, is contacted with ammonia in this manner, the impurities distribute themselves between the two phases. The distribution ratio is such that the minor portion of these impurities is left in the caustic phase and in the case of sodium chlorate, substantially none. For example, if a 50 percent caustic liquor is thus treated with ammonia liquor containing about 70 percent liquid ammonia and 30 percent water, the resulting purified caustic liquor is of about 50 percent concentration.

The caustic liquor will not be substantially concentrated or diluted under these conditions since liquid ammonia of the above dilution is in substantial equilibrium with a 50 percent caustic solution, and will absorb substantially no water therefrom.

By this method, I am able to treat an already fairly pure solution of caustic and to remove certain compounds, such as sodium chloride, sodium chlorate, and others which up until now have not been satisfactorily disposed of, thereby producing a similar concentrate which is purer than has hitherto been considered economically feasible.

In this manner, I am able to secure purification of caustic soda without substantial concentration in a simple manner since the caustic may be treated with ammonia, or ammonia-water mixtures of such water content that no substantial water is absorbed from the caustic. Thus, if anhydrous caustic soda is to be purified, anhydrous liquid ammonia would be used while if hydrated caustic is to be purified, it should be treated with ammonia liquor containing the predetermined quantity of water necessary to prevent substantial concentration of the caustic. The temperatures and pressures may be widely varied, providing the ammonia in contact with the caustic is maintained in the liquid state.

In carrying out this modification of my invention, the diluted ammonia liquor from column 40 to Fig. 2 is conducted through conduit 44 into the purifying column 60 at a point somewhat above the bottom thereof. The column is provided with an inlet 62 for the caustic to be purified and an outlet 66 for the ammoniacal liquor. The bottom portion 64 of column 60 is conical and, at the apex discharges through an outlet 68 for caustic liquors. Column 60 may be provided with suitable agitator and baffle structures substantially similar to those in column 40. The caustic, in being brought into contact with the diluted ammonia liquor as described above, is freed from its impurities and is discharged from the apparatus. The concentration of the purified caustic is not substantially increased over that of the untreated caustic and this process can be controlled to produce a purified caustic of a concentration which is substantially the same as that of the impure caustic in a manner more fully described and claimed in my copending application (Case A-27) Serial No. 179,335, filed December 11, 1937. In accordance with the invention claimed herein, the operation in column 40 can be so adjusted that the diluted ammonia liquor removed through conduit 44 is of such a desired water content that it can be used in column 60 to purify 50 percent caustic without substantial concentration thereof. The purified caustic liquor from tower 60 may also be used in the concentrating operation in columns 40 and 43 or in column 40 alone, thus avoiding excessive contamination of the ammonia liquor or liquid ammonia used in the process.

While my process has been described with reference to caustic-soda treatment, it may be similarly applied to the purification and concentration of any alkali metal hydroxide such as lithium and potassium hydroxides. Furthermore, it is not necessary that liquid ammonia be used since gaseous ammonia may be added and liquefied during the operation. It is also within the purview of my disclosure to use substituted ammonias such as methylamine, dimethylamine, and trimethylamine.

Although the present invention has been described in connection with the specific details of certain embodiments thereof, it is not intended that such details shall be regarded as limitations upon the scope of the invention except insofar as included in the accompanying claims.

By the terms "hydrated alkali metal hydroxide," "hydrated sodium hydroxide," etc., in the following claims, I intend to include the use of both aqueous solutions and solid hydroxides containing water.

I claim:

1. In a process of concentrating a sodium hydroxide-water mixture to a concentration substantially in excess of 50 per cent, the step which comprises subjecting a sodium hydroxide-water mixture of at least about 50 percent initial concentration to progressive washing with partially hydrated liquid ammonia containing progressively increasing concentrations of ammonia the amount of ammonia present during treatment being sufficient to insure the existence of a liquid phase containing a major portion of the ammonia and a second phase containing a major portion of said hydroxide.

2. In a process of concentrating an aqueous solution of sodium hydroxide to a concentration substantially in excess of 50 percent, the step which comprises subjecting an aqueous solution of sodium hydroxide of at least about 50 percent initial sodium hydroxide concentration to treatment with the quantity of a material of the group consisting of liquid ammonia and mixtures of liquid ammonia and water required to absorb sufficient water to yield an alkali hydroxide of a concentration of at least 60 percent of sodium hydroxide and removing the said ammonia and absorbed water the amount of ammonia present during treatment being sufficient to insure the existence of a liquid phase containing a major portion of the ammonia and a second liquid phase containing a substantial portion of said hydroxide.

3. In a process of concentrating a sodium hydroxide-water mixture to a concentration substantially in excess of 50 percent, the step which comprises subjecting a sodium hydroxide-water mixture of at least about 50 percent concentration to treatment with a material of the group consisting of liquid ammonia and mixtures of liquid ammonia and water in countercurrent flow the amount of ammonia present during treatment being sufficient to insure the existence of a liquid phase containing a major portion of the ammonia and a second phase containing a major portion of said hydroxide.

4. The process of concentrating hydrated sodium hydroxide to secure a concentration substantially in excess of 50 percent, which comprises subjecting a sodium hydroxide-water mixture of at least 50 percent sodium hydroxide concentration to treatment with a material of the group consisting of liquid ammonia and mixtures of liquid ammonia and water in countercurrent flow, whereby water is withdrawn from said hydroxide, and withdrawing concentrated sodium hydroxide the amount of ammonia present during treatment being sufficient to insure the existence of a liquid phase containing a major portion of the ammonia and a second phase containing a major portion of said hydroxide.

5. In a process of concentrating aqueous sodium hydroxide to a concentration substantially in excess of 50 percent, the steps which comprise subjecting aqueous sodium hydroxide of about 50 percent concentration to countercurrent treatment with a material of the group consisting of liquid ammonia and mixtures of liquid ammonia and water, and maintaining the temperature of operation under the pressure obtaining, sufficiently high and below the critical temperature of ammonia to prevent substantial solidification of the resultant concentrate at least during the major portion of the treatment the amount of ammonia present during treatment being sufficient to insure the existence of a liquid phase containing a major portion of the ammonia and a second phase containing a major portion of said hydroxide.

6. In a process of concentrating aqueous alkali metal hydroxide to a concentration substantially above 50 percent, the step which comprises subjecting the aqueous alkali metal hydroxide of a concentration above about 50 percent to washing with liquid ammonia the amount of ammonia present during treatment being sufficient to insure the existence of a liquid phase containing a major portion of the ammonia and a second liquid phase containing a substantial portion of said hydroxide.

7. A process of concentrating hydrated sodium hydroxide which comprises establishing a zone of treatment introducing an upwardly flowing body of a material of the group consisting of liquid ammonia and mixtures of liquid ammonia and water into a lower portion of said zone and aqueous sodium hydroxide of a concentration not substantially less than about 50 percent into the upper portion of said zone; permitting the hydroxide to settle through said zone with consequent concentration due to water absorption action of said material, withdrawing concentrated sodium hydroxide from a lower portion of said zone and diluted liquid ammonia from an upper portion of said zone the amount of ammonia present during treatment being sufficient to insure the existence of a liquid phase containing a major portion of the ammonia and a second phase containing a major portion of said hydroxide.

8. A process of concentrating hydrated sodium hydroxide which comprises establishing a zone of treatment, introducing an upwardly flowing body of a material of the group consisting of liquid ammonia and mixtures of liquid ammonia and water into a lower portion of said zone and aqueous sodium hydroxide of a concentration not substantially less than about 50 percent into the upper portion of said zone; permitting the hydroxide to settle through said zone with consequent concentration due to water absorption action of said material, and maintaining the conditions of operation such that substantial solidification is prevented at least while the major portion of the concentration is being effected the amount of ammonia present during treatment being sufficient to insure the existence of a liquid phase containing a major portion of the ammonia and a second phase containing a major portion of said hydroxide.

9. A process of concentrating hydrated sodium hydroxide which comprises, establishing a zone of treatment, introducing an upwardly flowing body of a material of the group consisting of liquid ammonia and mixtures of liquid ammonia and water into a lower portion of said zone and aqueous sodium hydroxide of a concentration not substantially less than about 50 percent into the upper portion of said zone; permitting the hydroxide to settle through said zone with consequent concentration due to water absorption action of said material, and maintaining temperature, pressure, and concentration of ammonia and sodium hydroxide such that a solidified concentrate precipitates and settles to the lower portion of said zone the amount of ammonia present during treatment being sufficient to insure the existence of a liquid phase containing a major portion of the ammonia and a second phase containing a major portion of said hydroxide.

10. A process of concentrating hydrated alkali metal hydroxides which comprises establishing a plurality of zones of treatment at progressively lower levels, introducing the hydroxide to be treated into the uppermost zone and a material of the group consisting of liquid ammonia and mixtures of liquid ammonia and water into the lowest zone whereby the two materials flow from zone to zone countercurrently to each other, intimately mixing the liquor in each zone while maintaining a substantial segregation of the liquor in each zone from the liquors in other zones, and withdrawing concentrated alkali metal hydroxide from a lower zone the amount of ammonia present during treatment being sufficient to insure the existence of a liquid phase containing a major portion of the ammonia and a second phase containing a major portion of said hydroxide.

11. A process of concentrating hydrated sodium hydroxide which comprises establishing a plurality of zones of treatment at progressively lower levels, introducing the hydroxide to be treated into the uppermost zone and a material of the group consisting of liquid ammonia and mixtures of liquid ammonia and water into the lowest zone whereby the two materials flow from zone to zone countercurrently to each other, intimately mixing the liquor in each zone while maintaining a substantial segregation of the liquor in each zone from the liquors in other zones and withdrawing concentrated sodium hydroxide from a lower zone the amount of ammonia present during treatment being sufficient to insure the existence of a liquid phase containing a major portion of the ammonia and a second phase containing a major portion of said hydroxide.

12. A method of concentrating hydrated alkali metal hydroxide which comprises establishing a body comprising aqueous alkali metal hydroxide having a concentration above about 50 percent hydroxide, introducing a material of the group consisting of liquid ammonia and mixtures of liquid ammonia and water into said body, and controlling the conditions of temperature, concentration of ammonia, and concentration of caustic such that a solid product will be precipitated and withdrawing said solid product countercurrent to the incoming ammonia liquor to effect washing thereby the amount of ammonia present during treatment being sufficient to insure the existence of a liquid phase containing a major portion of the ammonia and a second phase containing a major portion of said hydroxide.

13. The process of concentrating hydrated sodium hydroxide which comprises contacting a material of the group consisting of liquid ammonia and mixtures of liquid ammonia and water with solid hydrated sodium hydroxide while maintaining the conditions of operation such that a major portion of said hydroxide remains in the solid state throughout the process and separating the solid concentrated sodium hydroxide the amount of ammonia present during treatment being sufficient to insure the existence of a liquid phase containing a major portion of the ammonia and a second phase containing a major portion of said hydroxide.

14. A process for concentrating and purifying solid hydrated sodium hydroxide which comprises contacting the said sodium hydroxide in solid state with a material of the group consisting of liquid ammonia and mixtures of liquid ammonia and water to thereby produce a hydroxide of greater concentration the amount of ammonia present during treatment being sufficient to insure the existence of a liquid phase containing a major portion of the ammonia and a second phase containing a major portion of said hydroxide.

15. The process of concentrating hydrated sodium hydroxide which comprises establishing an upwardly flowing body comprising a material of the group consisting of liquid ammonia and mixtures of liquid ammonia and water, introducing solid hydrated sodium hydroxide of a concentration not substantially less than about 50 percent into said body to permit settling therethru and withdrawing concentrated sodium hydroxide from a lower portion of said stream the amount of ammonia present during treatment being sufficient to insure the existence of a liquid phase containing a major portion of the ammonia and a second phase containing a major portion of said hydroxide.

16. The method of concentrating sodium hydroxide which comprises countercurrently treating hydrated sodium hydroxide with a material of the group consisting of liquid ammonia and mixtures of liquid ammonia and water in such concentration and at such temperature as to produce solidified hydroxide and subjecting said solidified hydroxide to a washing treatment by withdrawing it countercurrent to the ammonia liquor introduced into the process the amount of ammonia present during treatment being sufficient to insure the existence of a liquid phase containing a major portion of the ammonia and a second phase containing a major portion of said hydroxide.

17. The method of concentrating hydrated sodium hydroxide which comprises establishing a zone of treatment comprising an upwardly flowing body of a material of the group consisting of liquid ammonia and mixtures of liquid ammonia and water, introducing hydrated sodium hydroxide into said zone to settle thru said flowing stream with consequent concentration, collecting the resultant concentrated hydroxide in the lower portion of said zone, introducing fresh liquid ammonia into said zone whereby a substantial precipitate of solid hydroxide concentrate is formed and withdrawing said precipitate countercurrently of the incoming ammonia to effect washing thereby the amount of ammonia present during treatment being sufficient to insure the existence of a liquid phase containing a major portion of the ammonia and a second phase containing a major portion of said hydroxide.

18. A method of purifying hydrated alkali metal hydroxides which comprises treating said hydroxides with a material of the group consisting of liquid ammonia and mixtures of liquid ammonia and water in such concentration and at such conditions of temperature that solid hydroxide separates from a liquid phase consisting preponderantly of ammonia and water, and a second liquid phase consisting preponderantly of alkali metal hydroxide and water, and filtering the entire liquid body so formed in a manner such that the first named liquid phase passes through the filter during the later stages of filtration, whereby solid material deposited upon the filter surface is washed by the ammonia liquor of said first-named phase the amount of ammonia present during treatment being sufficient to insure the existence of a liquid phase containing a major portion of the ammonia and a second phase containing a major portion of said hydroxide.

19. A method of concentrating aqueous caustic soda of not substantially less than 50 percent initial concentration which comprises causing the caustic to contact with substantially anhydrous liquid ammonia in countercurrent flow until the caustic is converted by absorption of water to a product consisting largely of the monohydrate containing about 69 percent of sodium hydroxide.

20. A continuous process for concentrating an hydrated alkali metal hydroxide which comprises establishing a body containing an aqueous alkali metal hydroxide having a concentration not substantially less than 50 percent by weight, calculated upon the ammonia-free basis, introducing a material of the group consisting of liquid ammonia and mixtures of liquid ammonia and water into a lower portion of said body in an amount sufficient to insure the separation of a liquid phase containing the major portion of the ammonia from a second liquid phase containing a major portion of said hydroxide, introducing aqueous alkali metal hydroxide to be concentrated into an upper portion of said body and withdrawing more concentrated hydroxide from a lower portion of said body.

21. A process for dehydrating an aqueous alkali metal hydroxide which comprises countercurrently contacting said hydroxide at a progressively increasing temperature with a material of the group consisting of liquid ammonia and mixtures of liquid ammonia and water, the amount of liquid ammonia being sufficient to insure the separation of a liquid phase containing a major portion of the ammonia from a liquid phase containing a portion of said hydroxide.

22. A process of concentrating hydrated sodium hydroxide which comprises treating said hydroxide with a material of the group consisting of liquid ammonia and mixtures of liquid ammonia and water, the amount of ammonia present during treatment being sufficient to insure the existence of a liquid phase containing a major portion of the ammonia and a quantity of water absorbed from said hydroxide, a second liquid phase containing a substantial portion of said hydroxide and a solidified hydroxide of higher concentration than the hyroxide in said liquid phase and removing solidified hydroxide together with some of said second liquid phase.

23. The process of claim 22 wherein the temperature is maintained sufficiently high to prevent precipitation of a solid hydrate whereby the solidified hydroxide is substantially anhydrous hydroxide.

24. A process of concentrating hydrated sodium hydroxide which comprises treating said hydroxide with a material of the group consisting of liquid ammonia and mixtures of liquid ammonia and water, the amount of ammonia present during treatment being sufficient to insure the existence of a liquid phase containing a major portion of the ammonia and a quantity of water absorbed from said hydroxide, a second liquid phase containing a substantial portion of said hydroxide and a solidified hydroxide of higher concentration than the hydroxide in said liquid phase and removing solidified hydroxide.

IRVING E. MUSKAT.